(12) United States Patent
Lipson et al.

(10) Patent No.: US 6,198,872 B1
(45) Date of Patent: Mar. 6, 2001

(54) PROGRAMMED FIBEROPTIC ILLUMINATED DISPLAY

(76) Inventors: Hyla Lipson; John Jones; David Jones, all of 950 SE. "M" St., Grants Pass, OR (US) 97526

( * ) Notice: Subject to any disclaimer, the term of this patent is extended or adjusted under 35 U.S.C. 154(b) by 0 days.

(21) Appl. No.: 09/358,056

(22) Filed: Jul. 21, 1999

Related U.S. Application Data

(60) Provisional application No. 60/093,536, filed on Jul. 21, 1998.

(51) Int. Cl.[7] .................................................... G02B 6/04
(52) U.S. Cl. ........................ 385/901; 385/115; 385/555
(58) Field of Search .................................... 362/554, 555, 362/556, 559; 385/901, 115

(56) References Cited

U.S. PATENT DOCUMENTS

| 4,917,448 | * | 4/1990 | Oppenhelmer | 350/96.1 |
|---|---|---|---|---|
| 4,975,809 | | 12/1990 | Ku . | |
| 5,013,109 | * | 5/1991 | Zelan et al. | 350/96.1 |
| 5,260,686 | | 11/1993 | Kuo . | |
| 5,295,216 | | 3/1994 | Halter . | |
| 5,448,455 | | 9/1995 | Ryan . | |
| 5,508,892 | | 4/1996 | Laczynski et al. . | |
| 5,892,436 | * | 4/1999 | Blackburn et al. | 340/457.1 |

* cited by examiner

*Primary Examiner*—Hung N. Ngo
(74) *Attorney, Agent, or Firm*—Anthony J. Casella; Gerald E. Hespos; Michael J. Porco

(57) ABSTRACT

A programmed illuminated display is provided. The display includes a panel having a plurality of apertures extending therethrough. An optical fiber is provided for each aperture. Each optical fiber has an emitting end aligned with the front face of the panel and a receiving end extending beyond the rear face of the panel. The optical fibers are grouped in a selected manner, and each group of the optical fibers is connected to an LED. The LED's are connected to a control circuit that includes a programmable chip. The chip is programmed to generate a selected firing order for the LED's which in turn direct light through the associated optical fibers for providing a programmed illumination for the display.

8 Claims, 5 Drawing Sheets

PROGRAMMED FIBEROPTIC ILLUMINATED DISPLAY

This application claims the benefit of Provisional Patent Application Ser. No. 60/093,536 filed Jul. 21, 1998.

BACKGROUND OF THE INVENTION

1. Field of the Invention

The subject invention relates to displays, such as advertising displays, that employ lighting patterns for purposes of attracting attention of potential consumers.

2. Description of the Prior Art

Point-of-purchase displays employ a variety of visual stimuli to attract the attention of potential purchasers. Illumination is recognized widely as an effective stimulus for attracting the attention of a potential customer. As a result, illumination has been used extensively in point-of-purchase displays.

Most illuminated point-of-purchase displays are large and costly. The hardware for achieving the illumination generally must be plugged into an alternating current source, and hence requires an unattractive and bulky wire to be draped from the display to an electrical outlet. Most prior art illuminated displays also generate significant heat. Thus, the illumination must be a considerable distance from the products being sold to avoid damaging the products and to avoid burning consumers.

Fiberoptics have been used in some prior art point-of-purchase displays. The typical prior art fiberoptic point-of-purchase display has include a single light source disposed at a location remote from the display. A plurality of optical fibers have had their light-receiving ends mounted in proximity to the light source. The optical fibers then extended from the light source to the prior art point-of-purchase display, and the emitting ends of the optical fibers were mounted into small holes in the point-of-purchase display. Displays that employ fiberoptics allow for a fine level of detailing and bright coloring. However, these prior art fiberoptic displays are not conducive to complex programming for altering the displays. Furthermore, the typical prior art display that employs fiberoptic components has required connection to an AC source of power for powering the display. This requirement for connection to an AC power source has limited the versatility of these displays.

Some such prior art displays have included a translucent color wheel rotatably mounted between the light source and the receiving ends of optical fibers. The wheel would cause different colors to pass between the light source and the optical fibers, thereby causing the illumination emitted from the opposed end of the optical fibers to change color. Other fiberoptic optical displays have rotated an opaque material between the light source and the receiving ends of the fiber. The opaque material would periodically interrupt the passage of light from the light source to the optical fibers. As a result, the light emitted from the ends of the optical fibers mounted in the display would blink. Some prior art displays mounted the receiving ends of the optical fibers in spaced relationship to one another. The opaque material then would move sequentially past the receiving ends. Consequently the emitting ends of the optical fibers would alternately blink. The programming options for the alternating blinking has been very limited and typically subjected to a short cycle of repetition.

Prior art displays with optical fibers have been visually attractive. However, these prior art displays have been fairly large and costly due to the separation between the light source and the display and due to the cumbersome prior art mechanisms for creating a variable illuminated display.

Light emitting diodes (LED's) are used in certain programmable displays. However, LED's do not provide the same level of detail as fiberoptics. Additionally, LED's typically are not as bright or colorful as fiberoptics.

SUMMARY OF THE INVENTION

The subject invention is directed to an advertising display or point-of-purchase display having portions that are selectively illuminable. The display includes an electronic circuit assembly capable of distributing current to each of a plurality of loads pursuant to a pre-programmed or pre-programmable sequence. For example, the electronic circuit assembly may include a pre-programmed or programmable integrated circuit chip or a microprocessor that is programmed to sequentially direct electrical current to each of a plurality of electrically conductive wires. The integrated circuit chip and other components on the circuit board may function as an array of solid state switches for alternately permitting or interrupting the flow of current from a power source to each of a plurality of electrically conductive wires. The power source may be a battery that is incorporated into the display. Alternatively, the power source may be at a remote location, and the display may merely include a wire for selectively connecting the display to the remote power source, such as a conventional alternating current outlet.

The display further includes a plurality of light emitting diodes that are connected respectively to ends of the electrically conductive wires remote from the circuit board. Thus, current from the wires will selectively activate the light emitting diodes and thereby cause pulses of light to be generated in accordance with a pattern that is dictated by the programmed or programmable components of the circuitry.

The apparatus further includes a plurality of electro-optical connectors connected to each of the light emitting diodes and at least one optical fiber extending from each electro-optical connector. Preferably, a plurality of optical fibers extend from each electro-optical connector. Thus, light generated from each of the light emitting diodes will be directed through the respective optical fibers.

Each optical fiber includes an emitting end remote from the electro-optical connector. The emitting ends of the optical fibers are disposed at a location on the display that permits the light signals to be visually observable by a potential customer. For example, the display may include a substantially rigid panel having a size and shape appropriate for the items being marketed by the display. The panel may include a front face and an opposed rear face. The front face of the panel may be provided with appropriate graphic designs and indicia. The rear face of the panel may have the above-described electro-optical components mounted thereon. The panel is provided with a plurality of apertures extending therethrough from the front face to the rear face. The apertures have diameters substantially conforming to the diameters of the respective optical fibers. The emitting ends of the optical fibers may be passed into and/or through the respective apertures from the rear face to the front face such that the emitting ends of the optical fibers are substantially flush with the front face of the panel. An adhesive material or a curable resin may be applied to the rear face of the panel at locations surrounding the apertures. Thus, the adhesive or other curable resin may securely hold the respective optical fibers in the apertures.

The apertures through the panel preferably are disposed in accordance with a pattern that corresponds with the graphics or indicia presented on the front face of the panel. Additionally, the optical fibers extend from the respective electro-optical connectors in a manner that will generate signals consistent with the graphics and indicia presented on the front face of the panel. For example, the optical fibers could be directed to locations that correspond to graphically depicted wheels of a vehicle. The optical fibers could be arranged to produce a sequential lighting pattern that suggests rotation of the wheels.

The apertures in the panel may be disposed to define a plurality of spaced apart groups of apertures. Each group may receive optical fibers extending from a plurality of different light emitting diodes. Thus, the optical fibers in each group of apertures may not all be turned on or off simultaneously. Rather, the optical fibers in each group of apertures on the display panel may be sequentially lit to suggest a twinkling effect, an effect of apparent motion or variable color pattern. Each of the groups may undergo the same pattern of variable illumination or different patterns of variable illumination.

The display apparatus is capable of producing very striking visual effects at a fairly low cost. Additionally, the apparatus can be very small and light weight and will generate very little heat. Additionally, the apparatus enables very striking optical effects to be incorporated into an extremely small display, such as a display the size of a beverage can, a box of candy or a pack of cigarettes. For example, the panel that bears the optical fibers may be a scale replica of a box of candy and my be mounted in a display of actual boxes of candy. Thus, one apparent box of candy in a display will continuously produce changing lighting patterns that are appropriate for the message to be conveyed by that particular display.

DETAILED DESCRIPTION OF THE PREFERRED EMBODIMENT

Figure 1:
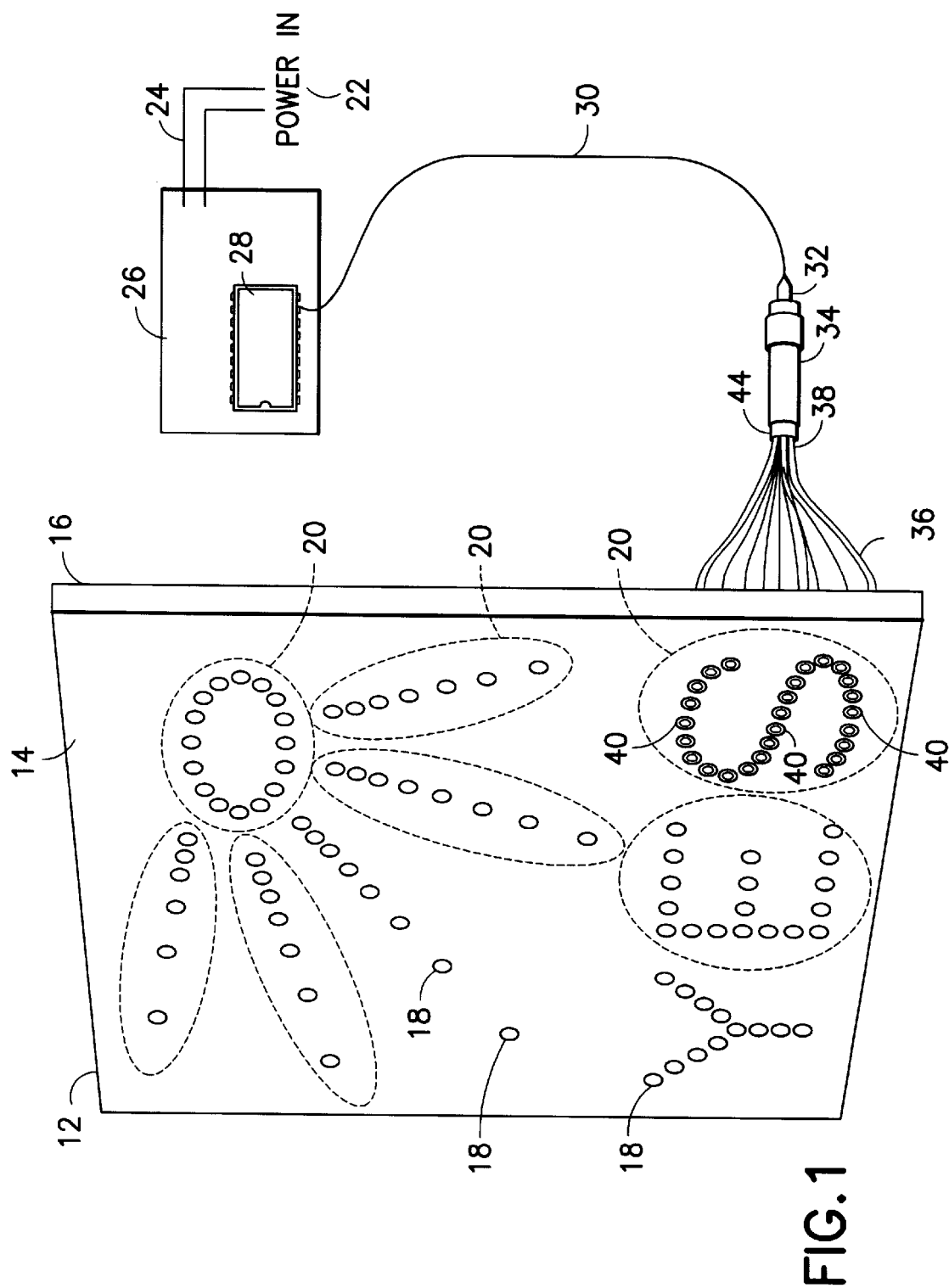
FIG. 1 is a perspective view of a display in accordance with the subject invention.
Figure 2:
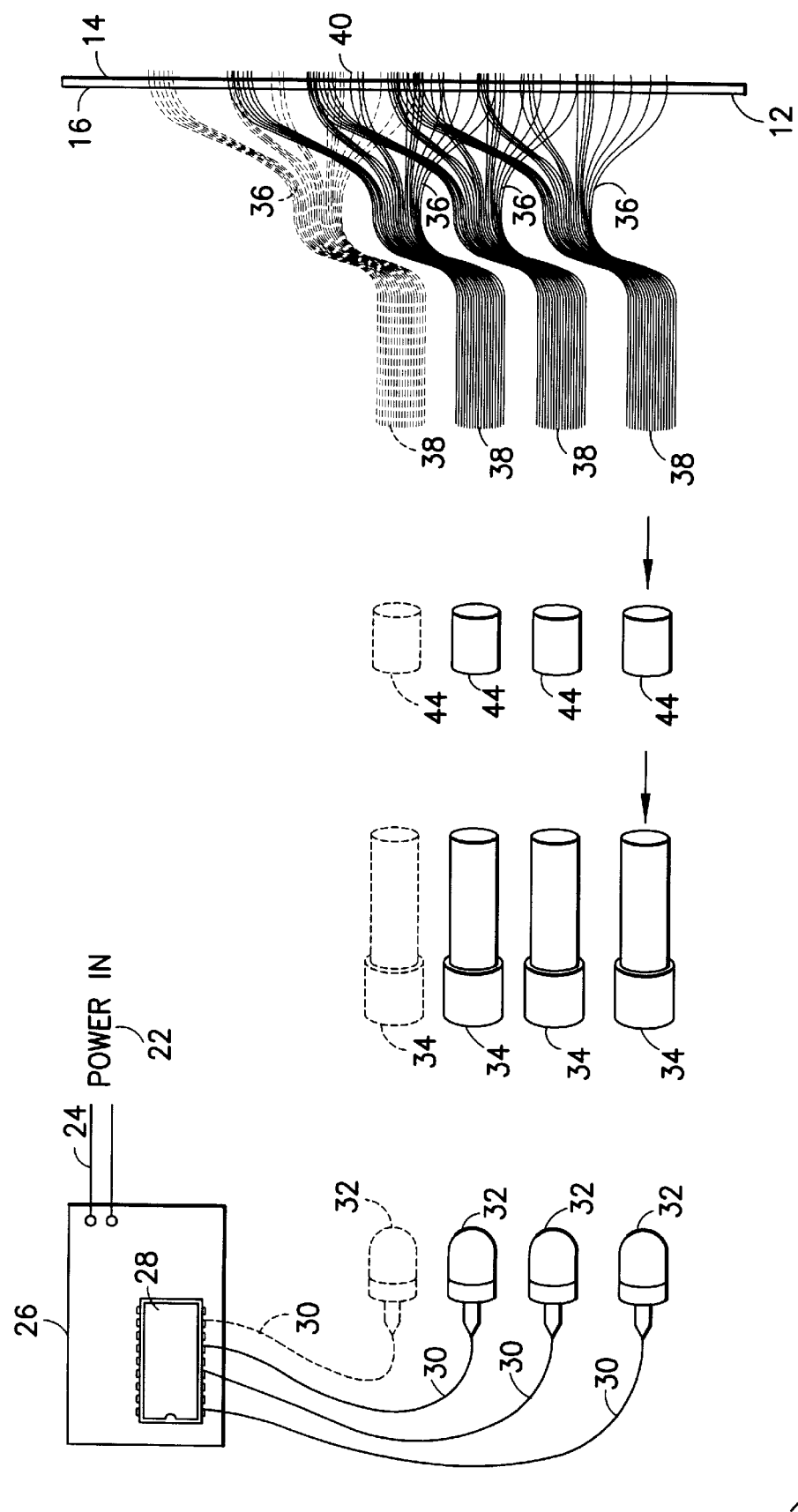
FIG. 2 is an exploded side elevational view of a display in accordance with the subject invention.
Figure 3:
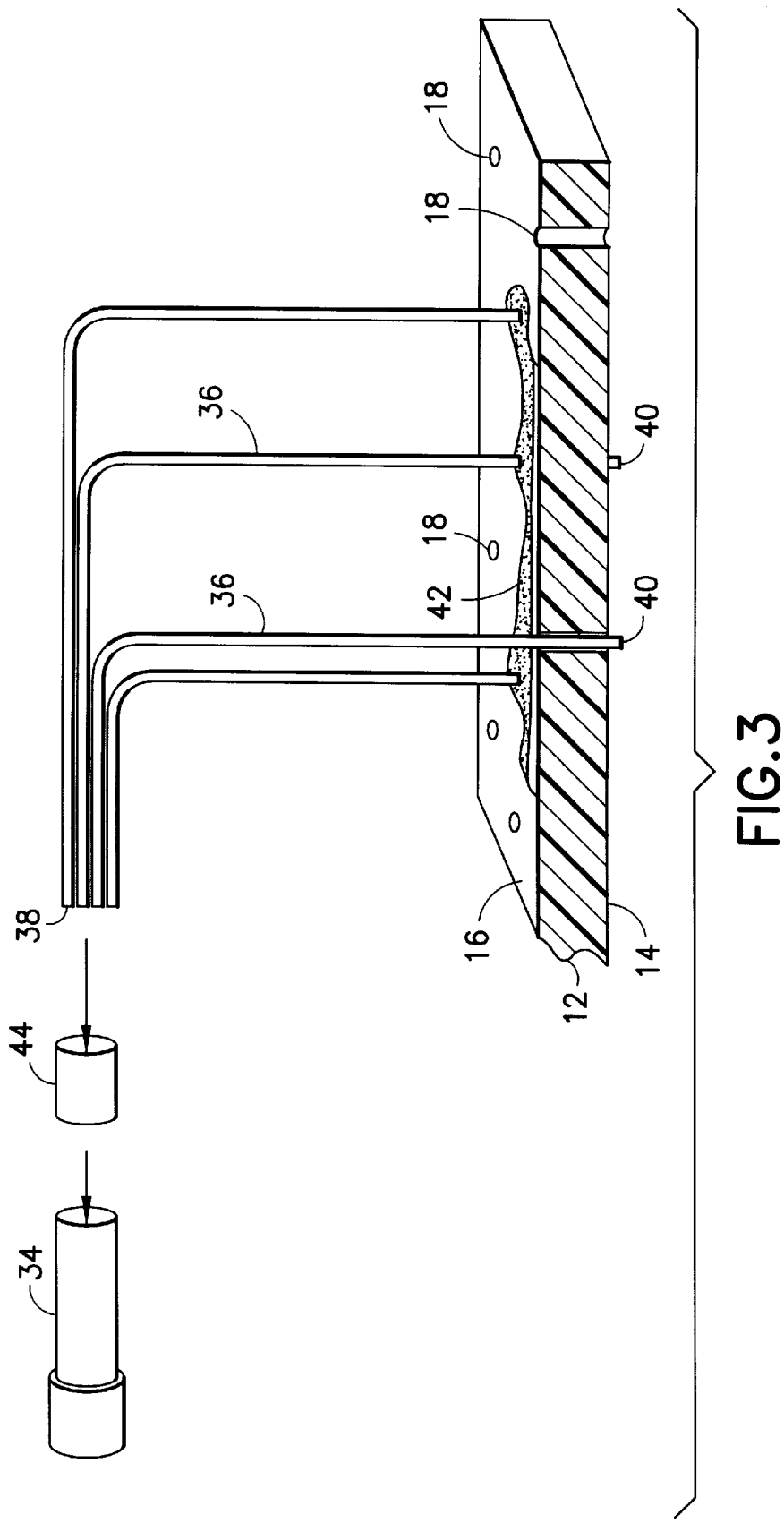
FIG. 3 is an exploded cross-sectional view of the display.

A display in accordance with the subject invention is identified generally by the numeral 10 in FIGS. 1–3. The display 10 includes a panel 12 formed from a rigid sheet of plastic. The panel 12 includes a front face 14 and an opposed rear face 16. For simplicity, the panel 12 is depicted as being a substantially planar display. However, other optional shapes may be employed, including non-planar shapes, in accordance with intended purpose of the display 10.

The front face 14 of the panel 12 preferably is provided with graphic representations that are appropriate for the intended purpose of the display 10. The graphic representations may be printed directly on the plastic of the panel 12 or may be printed on a sheet laminated onto the front face 14. The graphic representations may include the trademark of an article being promoted by the display as well as other written indicia. Additionally, the graphics on the front face 14 of the panel 12 may include designs that are appropriate for the product being marketed by the display 10.

The panel 12 further includes a plurality of apertures 18 extending through the panel 12 from the front face 14 to the rear face 16. The process of forming the apertures 18 is referred to generically as piercing, and encompasses any of several manual or automated aperture forming processees as described herein. The result of piercing should be to define apertures 18 that are slightly larger in diameter than the average diameter of the optical fibers to be placed in the apertures 18. Apertures 18 that are too small will not allow for proper insertion of the optical fibers into a panel 12. Before the piercing begins, a determination should be made as to whether the emitting ends on the optical fibers will be sanded. Sanding will produce a slightly brighter output from the optical fibers. However, sanding will require the panel to be masked, and the masking conveniently should be applied prior to piercing the apertures 18. The mask can be any adhesive backed prepping material that is common in the sign industry. The masking should be applied at least to areas of the panel 12 that will have the apertures 18 formed therein.

The piercing of apertures can be done by hand using any manually operated equipment. However, manual piercing of the apertures 18 typically will require a jig or pattern to be positioned relative to the panel 12 to ensure proper disposition of the apertures 18. Alternatively, the piercing of apertures 18 can be achieved by available automated means, such as a laser apparatus or CNC. Automated piercing means typically will require a registration jig to which the panel 12 will be mounted relative to the automated piercing means.

The apertures may be arranged in a plurality of spaced apart groups 20, with each group 20 having a plurality of apertures 18 therein. The pattern of apertures 18 and groups 20 will be selected to conform with the graphic material presented on the front face 14 of the panel 12 in accordance with the effect that is intended to be conveyed by the display 10.

The arrangement of apertures 18 will be referred to as the "dotting pattern". The dotting pattern establishes the number of optical fibers or fiber count. Additionally, the dotting pattern determines the absolute positioning of the fibers on the panel 12. The specific pattern can be produced manually or through electronic means. The pattern will depend upon budgetary concerns and the intended aesthetic effect. The dotting pattern may first have to be produced on a pattern, template or jig if the apertures 18 are to be pierced manually. The pattern, template or jig then may be affixed to the panel 12 to ensure proper locationing of the apertures 18. Alternatively, the locations of the apertures 18 will have to be converted to X, Y coordinates if the apertures 18 are to be formed by an automated apparatus.

The operative components of the display 10 are mounted on the rear face 16 of the panel 12 as shown in FIG. 2. More particularly, the display 10 includes a battery 22 removably attached to the rear face 16. Wires 24 extend from the battery 22 to an electronic circuit board 26. The circuit board includes an integrated circuit chip 28 that is programmed to function as a solid state switching device for directing current in a programmed sequence to each of a plurality of electrically conductive paths printed on the circuit board 26 and eventually to each of a plurality of electrically conductive wires 30 extending from the circuit board 26. Ends of the respective electrically conductive wires 30 remote from the circuit board 26 are connected respectively to light emitting diodes (LED's) 32. Thus, current directed through the wires 30 will activate the respective LED's 32 for producing pulses of light in accordance with a programmed sequence and/or pattern controlled by the integrated circuit chip 28.

The LED's 32 are mounted in electro-optical connectors 34 at the ends of the respective wires 30 remote from the circuit board 26. Each electro-optical connector 34 also receives a plurality of optical fibers 36. The optical fibers 36 have a receiving end 38 mounted in an optical fiber bushing 44 which in turn is mounted in one of the electro-optical connectors 34. Each of the optical fibers 36 also has an emitting end 40 mounted in one of the apertures 18 in the panel. More particularly, the emitting ends 40 of the respective optical fibers 36 are disposed to be substantially flush with the front face 14 of the panel 12. A curable resin 42 is applied to the rear face 16 of the panel 12 at locations substantially surrounding the groups 20 of apertures 18. The resin 42 hardens to hold the emitting ends 40 of the respective optical fibers 36 in the apertures 18.

Each optical fiber 36 is assigned to a particular LED 32, and each LED 32 is assigned a location or aperture 18 within the display 10. Each optical fiber 36 must have a sufficient length to insert the emitting end 40 into the appropriate aperture 18 and to have the receiving 38 thereof reach the location of the corresponding LED 32.

The optical fiber bushing 44 is a short section of cylindrical tubing that may be formed from metal or plastic. The optical fiber bushing 44 has an outside diameter equal to or slightly less than the inner diameter of the barrel of the electro-optical connector 34. Thus, the outside diameter of the bushing 44 will be determined by the sizes of the LED's 32 used with the display 10. The inside diameter of the optical fiber bushing 44 will be a function of the dimensions of the optical fibers 36 and the number of optical fibers 36.

Figure 4A:
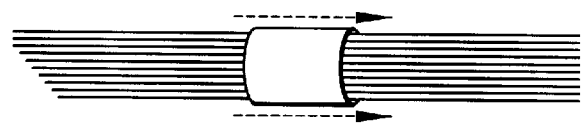
FIGS. 4A–4E schematically depict the sequential steps involved in joining a plurality of optical fibers for subsequent connection to a light emitting diode.
Figure 4B:
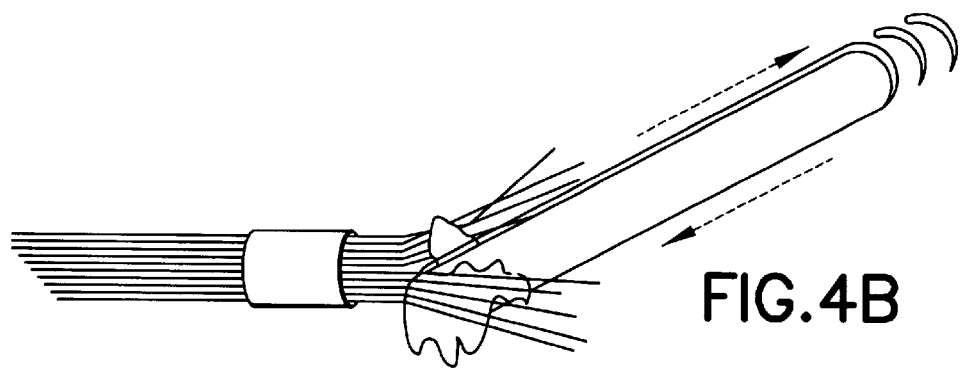
Figure 4C:
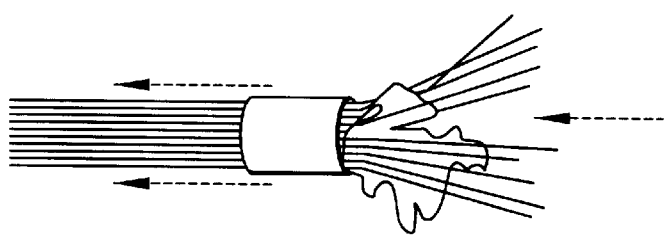
Figure 4D:
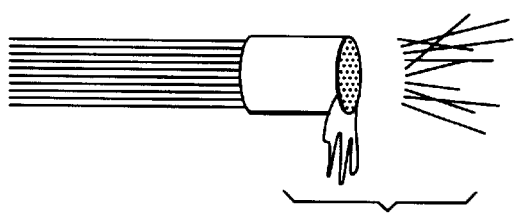
Figure 4E:

Optical fibers 36 of appropriate length are inserted into the bushings 44 as shown in FIG. 4A to achieve the proper cross-sectional matching of fibers 36 to bushings 44. The inserting of the optical fibers 36 into the respective bushings 44 is carried out until the ends of the optical fibers 36 extend approximately 0.75 inch beyond the associated bushing 44. An epoxy resin with a cure time of 5–15 minutes is applied liberally to the ends of the optical fibers 36 that extend beyond the bushing 44, as shown in FIG. 4B. Before the epoxy hardens, the portions of the fibers 36 that extend beyond the bushing 44 are pulled partly back, as shown in FIG. 4C, into the bushings so that only about 0.25 inch extends beyond the respective bushing 44. Excess epoxy then is wiped from the optical fibers 36 and bushing 44, and the assembly of the optical fibers 36 and the associated bushing 44 is permitted to cure and harden. After hardening, a fine toothed saw is employed, as shown in FIG. 4D to cut off portions of the optical fibers 36 that had extended beyond the bushing 44. As noted above, this typically will involve a removal of approximately 0.25 inch. Portions of the optical fibers 36 at the bushing 44 will define the receiving ends 38 of the optical fibers 36. These receiving ends 38 preferably are sanded and polished to align substantially precisely with the end of the bushing 44, as shown in FIG. 4E.

The process of assembling the display proceeds by extending the respective optical fibers 36 from the bushing 40 to an appropriate one of the preselected apertures 18 in the panel 12. More particularly, the emitting end 40 of each optical fiber 36 is inserted into a specified aperture 18 until the receiving end 40 substantially aligns with the front face 14 of the panel 12.

The assembling process for the display 10 proceeds by applying the curable resin adhesive 42 to portions of the rear face 16 of the panel 12 in proximity to the optical fibers 36. The adhesive 42 can be selected from any commercially available adhesive that does not damage the optical fiber 36 and that will adhere to the panel 12. Typically an epoxy with a cure time of approximately 5–30 minutes will be acceptable. The adhesive 42 should be employed in a manner to ensure adhesion to both the optical fiber 36 and to the rear face 16 of the panel 12.

After the adhesive 42 has cured, any portions of the optical fibers 36 that extend beyond the front face 14 of the panel 12 are removed by clipping with a commercially available optical fiber cutter. If it was determined that a polishing is required for the emitting ends 40, this polishing will be carried out prior to removal of any mask that had been applied over the front face 14 of panel 12.

The optical fiber bushings 44 are slid into appropriate electro-optical connectors 34 which preferably are cylindrical tubes of an opaque plastic. Dimensional variations in certain bushings 44 or connectors 34 may lead to a loose fit. In these situations, a supplementary connection is required to prevent separation of the optical fiber bushings 44 from the corresponding connectors 34. The supplemental connectors may include taping, gluing or crimping to prevent inadvertent separation.

As shown in FIGS. 1–3, the optical fibers 36 from each electro-optical connector 34 may extend to different groups 20 of apertures 18. Conversely, the apertures 18 in a group of apertures 20 may have optical fibers 36 from each of a plurality of different electro-optical connectors 34. The light emitting diodes 32 will be illuminated according to the particular sequence or pattern being dictated by the programmed chip 28. Thus, the light emitting diodes 32 will be illuminated at different respective times. The pattern of distributing the optical fibers 36 from the light emitting diodes 32 to the apertures 18 will result in the apertures 18 in any given group 20 having a variable pattern of illumination. The pattern may be selected to suggest motion, or twinkling or variation in color.

Considerations for programming the LED's 32 are color, firing order and grouping. Color refers to the intended or desired color to be visible at the emitting end 40 of the optical fiber 36, and must be attached to an LED 32 of the same color, or an LED 32 capable of producing the intended color.

The programming for the LED/fiberoptic display follows the same general requirement for programming any typical display of LED's 32. One difference, however, is the introduction of consideration for different colors for each LED 32 and the complexity that the final detail levels can make possible due to the optical fibers 36. The firing order is a term that refers to the on/off sequencing and duration states for each LED 32, as well as the sequential relationships that are produced by groups of LED's 32. For example, if the words "TEXT" were rendered in optical fibers 36, with the optical fibers 36 for each letter going to a single LED 32, there would be a total of four LED's 32. Each LED 32 would have its own firing order or its own on and off sequencing. At the single LED 32 level, there would be no recognizable order to this activity, but when the LED's 32 are taken as a grouping, the intended pattern is recognized. A sample arrangement of firing order and grouping for the word "TEXT" is shown in Table 1 below. Programming establishes the count of all LED's 32 and is needed based on color and on the sequential firing order.

TABLE 1

Grouped LED Units's Firing Order

| LED unit's | 1s | 2s | 3s | 4s | 5s | 6s | 7s | 8s | 9s | 10s | 11s | 12s |
|---|---|---|---|---|---|---|---|---|---|---|---|---|
| T firing order | On | On | On | On | Off | On | On | Off | On | Off | On | Off |
| E firing order | Off | On | On | On | Off | On | On | Off | On | Off | On | Off |
| X firing order | Off | Off | On | On | Off | On | On | Off | On | Off | On | Off |
| T firing order | Off | Off | Off | On | Off | On | On | Off | On | Off | On | Off |

Figure 5:
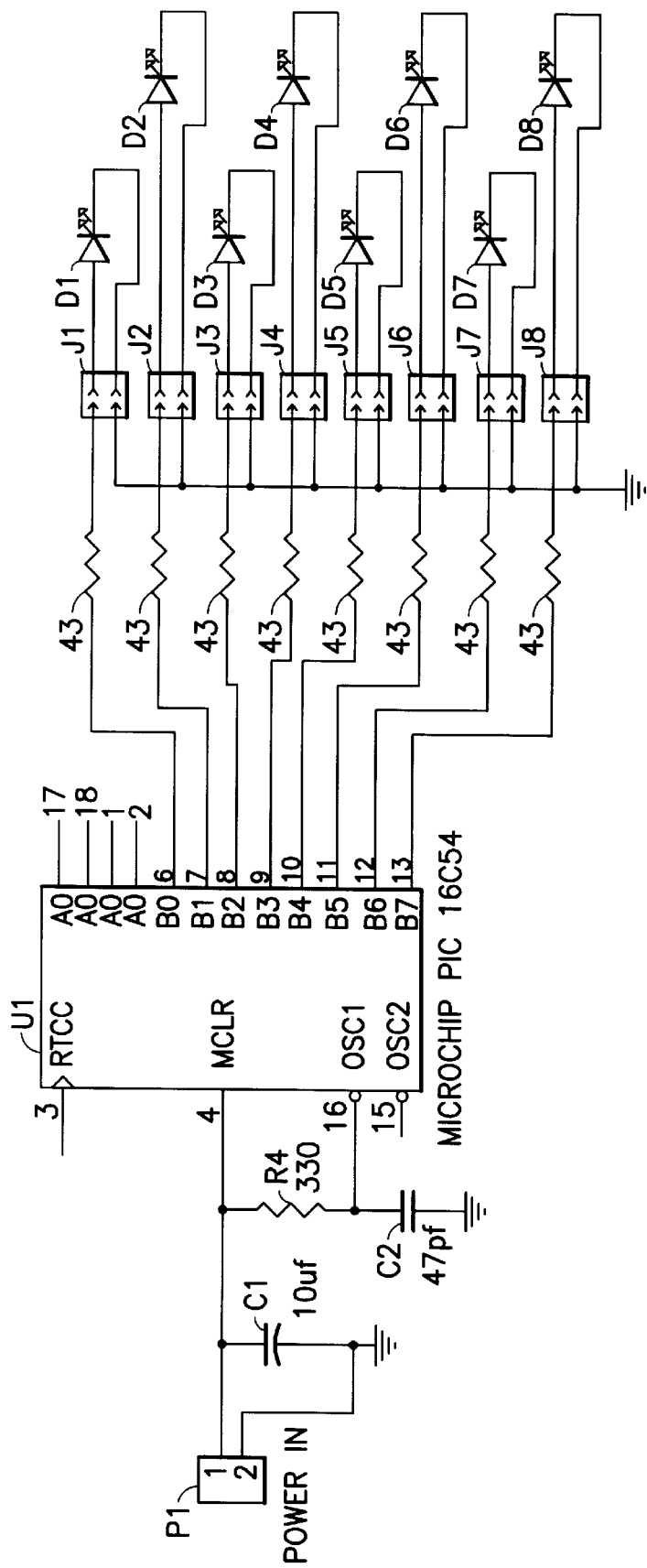
FIG. 5 is a circuit diagram of the control circuit for the display.

FIG. 5 shows a sample circuit diagram for the circuit board 26. The components employed in this circuit are listed in Table 2 below.

TABLE 2

| Item | Quantity | Reference | |
|---|---|---|---|
| 1 | 1 | C1 | 10 uf |
| 2 | 1 | C2 | 47 pf |
| 3 | 8 | D1 | LED |
| | | D2 | LED |
| | | D3 | LED |
| | | D4 | LED |
| | | D5 | LED |
| | | D6 | LED |
| | | D7 | LED |
| | | D8 | LED |
| 4 | 8 | J1 | LED Wire Connector |
| | | J2 | LED Wire Connector |
| | | J3 | LED Wire Connector |
| | | J4 | LED Wire Connector |
| | | J5 | LED Wire Connector |
| | | J6 | LED Wire Connector |
| | | J7 | LED Wire Connector |
| | | J8 | LED Wire Connector |
| 5 | 1 | P1 | Power Input Connector |
| 6 | 8 | R1 | 43 ohm |
| | | R2 | 43 ohm |
| | | R3 | 43 ohm |
| | | R4 | 43 ohm |
| | | R5 | 43 ohm |
| | | R6 | 43 ohm |
| | | R7 | 43 ohm |
| | | R8 | 43 ohm |
| | | R9 | 43 ohm |
| 7 | 1 | R4 | 330 ohm |
| 8 | 1 | U1 | PIC16C54 |

The chip 28 is programmed in a conventional manner to generate signals sequentially and/or in patterns for activating the respective LED's 32. This sequencing is the above-described firing order. Light emitted from the LED 32 will impinge upon the receiving end 38 of each optical fiber 36 that is joined to the corresponding LED 32 by the bushing 44 and the electro-optical connector 34 as explained above. Light then will be transmitted through the optical fiber 36 and will be emitted from the emitting end 40 at the front face 14 of the panel 12. As noted above, the number and location of the emitting ends 40 of the optical fibers 36 will be selected in accordance with budgetary considerations and the intended artistic effect.

What is claimed is:

1. A programmable display device comprising:
   a panel having opposed front and rear faces and a plurality of apertures extending therethrough;
   a plurality of optical fibers, each said optical fiber having an emitting end and a receiving end, the emitting ends of the optical fibers being mounted in the respective apertures such that the receiving ends of the optical fibers are spaced from the rear face of the panel;
   a plurality of LED's, each LED being connected in juxtaposed to the receiving at least one optical fiber; and
   a control circuit for generating a programmed sequence of signals for selectively illuminating the LED's, such that the LED's direct light into the receiving end of each said optical fiber connected thereto and such that light from the respective light emitting diodes are directed through the optical fibers and from the emitting ends of the optical fibers at the front face of the display panel.

2. The display of claim 1, wherein at least one said LED is in juxtaposed relationship to the receiving ends of a plurality of optical fibers.

3. The display of claim 1, wherein the plurality of optical fibers comprises at least one group of optical fibers that have their receiving ends aligned with one said LED by an optical fiber bushing, said optical fiber bushing being a hollow cylinder surrounding and securely holding the optical fibers of the group in a substantially cylindrical array with the respective receiving ends substantially aligned with one another, at least one electro optical connector surrounding the optical fiber bushing and the respective LED for holding the LED in alignment with the receiving ends of the optical fibers.

4. The display of claim 3, wherein the receiving ends of the plurality of optical fibers are retained in the bushing by adhesive.

5. The display of claim 1, wherein the front face of the panel is provided with indicia thereon, the apertures being disposed to align with the indicia.

6. The display of claim 1, where the emitting ends of the optical fibers are secured to the panel by adhesive applied to the rear face of the panel in proximity to the apertures therein.

7. The display of claim 6, wherein the emitting ends of the optical fibers align with the front face of the panel.

8. A display device comprising:
   a control circuit having a programmable chip programmed for producing a selected programmed sequence of signals;
   a plurality of LED's connected respectively to the control circuit for receiving signals from the control circuit in accordance with the programmed sequence established by the programmable chip of the control circuit;
   a plurality of substantially tubular electro-optical connectors, each said tubular electro-optical connector having a first end mounted to one said LED and a second end extending from the LED;
   a plurality of groups of optical fibers, each said optical fiber having a receiving end and an emitting end, the receiving ends of the optical fibers in each said group being securely retained in the second end of a selected one of the electro-optical connectors such that light emitted from the LED in the first end of the respective electro-optical connector impinges upon the receiving ends of the optical fibers in the group secured in the second end of the respective electro-optical connector; and
   a display panel having a front face, a rear face and a plurality of apertures extending therethrough, each said optical fiber having its emitting end secured in one said aperture such that the receiving end substantially aligns with the front face of the panel.

* * * * *